(12) United States Patent
Moutaux et al.

(10) Patent No.: US 12,320,307 B2
(45) Date of Patent: Jun. 3, 2025

(54) SYSTEM FOR PUMPING AND METERING A FLUID FOR A TURBINE ENGINE AND METHOD FOR CONTROLLING SUCH A SYSTEM

(71) Applicant: SAFRAN HELICOPTER ENGINES, Bordes (FR)

(72) Inventors: Antoine Pascal Moutaux, Moissy-Cramayel (FR); Alexis Thomas Valentin Longin, Moissy-Cramayel (FR); David Bernard Martin Lemay, Moissy-Cramayel (FR); Philippe Jean Rene Marie Benezech, Moissy-Cramayel (FR); Pierre Anthony Sicaire, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/550,658

(22) PCT Filed: Mar. 16, 2022

(86) PCT No.: PCT/FR2022/050477
§ 371 (c)(1),
(2) Date: Sep. 14, 2023

(87) PCT Pub. No.: WO2022/195224
PCT Pub. Date: Sep. 22, 2022

(65) Prior Publication Data
US 2024/0159192 A1    May 16, 2024

(30) Foreign Application Priority Data

Mar. 17, 2021  (FR) ........................................ 2102694
Mar. 17, 2021  (FR) ........................................ 2102695

(51) Int. Cl.
*F02C 9/30*        (2006.01)

(52) U.S. Cl.
CPC .......... *F02C 9/30* (2013.01); *F05D 2220/323* (2013.01); *F05D 2260/84* (2013.01); *F05D 2270/09* (2013.01)

(58) Field of Classification Search
CPC ....................................................... F02C 7/236
See application file for complete search history.

(56) References Cited

U.S. PATENT DOCUMENTS 2,812,715 A * 11/1957 Redding .................. F02C 7/236
                                                                                    417/248
4,248,040 A *  2/1981 Kast .......................... F02C 9/46
                                                                                    60/39.27

(Continued)

FOREIGN PATENT DOCUMENTS

CA      3128334 A1    8/2020
EP      3020941 A1    5/2016

(Continued)

OTHER PUBLICATIONS

Machine translation of JP201052315 (Year: 2015).*

(Continued)

*Primary Examiner* — David P. Olynick
(74) *Attorney, Agent, or Firm* — WOMBLE BOND DICKINSON (US) LLP

(57) ABSTRACT

A system for pumping and metering a fluid for a turbine engine, which system includes at least one pump for the fluid and an electronic computer configured to determine the flow rate of the fluid to be delivered to the turbine engine, the pumping and metering system being wherein it further includes a first electric motor and a second electric motor, which are each configured to drive the at least one pump, and in that the electronic computer includes a first control loop (Continued)

for controlling at least the first electric motor and a second control loop for controlling at least the second electric motor.

20 Claims, 14 Drawing Sheets

(56) References Cited

U.S. PATENT DOCUMENTS

| | | | | |
|---|---|---|---|---|
| 5,067,080 | A | * | 11/1991 | Farman ................ G05D 1/0077 |
| | | | | 701/99 |
| 5,436,826 | A | * | 7/1995 | O'Flarity ............ G05D 1/0077 |
| | | | | 701/100 |
| 7,840,336 | B2 | * | 11/2010 | Muramatsu ............... F02C 9/28 |
| | | | | 123/495 |
| 2005/0111988 | A1 | * | 5/2005 | Griffiths ................. F04B 51/00 |
| | | | | 417/53 |
| 2010/0037867 | A1 | * | 2/2010 | Kleckler ................ F02C 7/236 |
| | | | | 123/510 |
| 2010/0064658 | A1 | * | 3/2010 | Wittmann ................ F02C 7/14 |
| | | | | 60/734 |
| 2013/0287594 | A1 | * | 10/2013 | Oyori .................... F02M 37/18 |
| | | | | 417/2 |
| 2016/0138473 | A1 | | 5/2016 | Veilleux et al. |
| 2016/0169112 | A1 | | 6/2016 | Morioka et al. |
| 2018/0045122 | A1 | * | 2/2018 | Veilleux ................. F02C 7/236 |
| 2021/0180520 | A1 | * | 6/2021 | Herring .................... F02C 9/46 |
| 2022/0128006 | A1 | * | 4/2022 | Shimamura ............... F02C 7/22 |
| 2022/0403785 | A1 | * | 12/2022 | Okuwa .................... F02C 7/22 |
| 2023/0055993 | A1 | * | 2/2023 | Haugsjaahabink ....... F02C 9/28 |

FOREIGN PATENT DOCUMENTS

| | | | | |
|---|---|---|---|---|
| EP | 3040277 | A1 | | 7/2016 |
| JP | 2013-032707 | A | | 2/2013 |
| JP | 2015052315 | A | * | 3/2015 ............. F02C 7/236 |
| WO | 2020/229754 | A1 | | 11/2020 |

OTHER PUBLICATIONS

Multiple Pumps—Simple Control, https://www.danfoss.com/en/about-danfoss/articles/dds/multiple-pumps-simple-control/, Apr. 17, 2015, downloaded May 2, 2024. (Year: 2015).*

International Search Report received for PCT Patent Application No. PCT/FR2022/050477, mailed on Jun. 13, 2022, 6 pages (2 pages of English Translation and 4 pages of Original Document).

* cited by examiner

SYSTEM FOR PUMPING AND METERING A FLUID FOR A TURBINE ENGINE AND METHOD FOR CONTROLLING SUCH A SYSTEM

TECHNICAL FIELD OF THE INVENTION

This invention relates to a system for pumping and metering a fluid for a turbine engine, a turbine engine comprising it and a method for controlling such a system.

TECHNICAL BACKGROUND

In the aeronautical field, turbine engines comprise numerous fluid pumping members, for example a main pumping member of a fuel circuit of a turbine engine, a low-pressure pumping member of a fuel circuit of a turbine engine or a pumping member of an oil circuit of a turbine engine. These fluid circuits require a generation of hydraulic power and, if necessary, the metering of the flow rate of the fluid.

In general, the main hydraulic power is generated by one or more pumps (referred to as high-pressure pumps) driven mechanically via the gas generator of the turbine engine. In order for the high-pressure pump or pumps to operate correctly, it may be necessary to generate hydraulic boost power upstream, which can be carried out by means of one or more pumps (referred to as low-pressure pumps or "engine booster pumps") also driven mechanically via the gas generator of the turbine engine. The fuel metering, downstream of the high-pressure pumps is generally carried out by a hydraulic device controlled by an electronic controller.

However, the mechanically driven pumps have a number of disadvantages. This is because the pump or the pumps are sized for the worst-case operating situation, e.g., an aged pump, the worst conditions in the flight envelope, the worst temperature of the fluid, etc. The hydraulic power delivered by the pump or the pumps is therefore generally greater than the current requirements of the turbine engine, causing an unnecessary mechanical power withdrawal from the gas generator and an elevation of the fluid temperature.

In addition, the mass of the mechanical drive (drive pinions and casings of the reducer) and the hydraulic members or components themselves (pumps, metering valves, pressure regulator) is significant.

In addition, the assembly of the device for metering the fluid required to ensure the metering accuracy demanded by the regulation is highly complex.

In addition, on the fuel circuits of the existing aeronautical turboprop engines, such as helicopter turboshaft engines, turbofan engines or aircraft turboprop engines, the control and actuation members are generally redundant, unlike the hydromechanical metering members (differential pressure regulator, valve). In this case, a blockage in the metering system leads to a loss of turbine engine operability.

Eliminating the mechanical drive for the oil and fuel pumps is an essential step towards the total elimination of the accessory box of the turbine engines, allowing in particular reduce the amount of mechanical power drawn from the gas generator.

In some applications, the turbine engine uses a high-pressure main pump, also referred to as a metering pump, comprising an electric motor to drive it, which provides both the main hydraulic power generation and the metering of the flow rate of the fuel. On the other hand, these metering pumps, also referred to as "motor pumps", are simplex members, meaning that a failure of the motor pump stops the feeding of fuel or of lubrication to the turbine engine, leading to an in-flight engine shutdown.

The aim of the present invention is to remedy at least some of these disadvantages.

SUMMARY OF THE INVENTION

The invention proposes a system for pumping and metering a fluid for a turbine engine comprising a first and a second motor pumps for the fluid and an electronic computer configured to determine the flow rate of the fluid to be delivered to the turbine engine, each motor pump comprising a pump and a motor configured to drive the pump, the pumping and metering system being characterised in that the electronic computer comprises a first regulation loop intended to control at least the first motor pump and a second regulation loop intended to control at least the second motor pump, and in which the first motor pump and the second motor pump are arranged in series between a fluid reservoir and a member of the turbine engine to be fed with fluid.

The invention therefore proposes an alternative to the mechanically driven fluid metering and pressurisation systems that provides the same level of safety as the latter.

The invention also allows to reduce the weight for the pumping and metering system.

The system for pumping and metering a fluid according to the invention may comprise one or more of the following characteristics, taken separately or in combination with one another:
- the system for pumping and metering a fluid is configured to generate a flow rate of the fluid, the fluid being fuel or lubricating oil;
- the system for pumping and metering a fluid is configured to pressurise the fluid, the fluid being fuel for feeding a main metering system of the turbine engine;
- the system for pumping and metering a fluid comprises a first non-return device arranged in parallel with the pump of the first motor pump and a second non-return device arranged in parallel with the pump of the second motor pump.

The present invention also relates to a turbine engine, characterised in that it comprises at least one system for pumping and metering a fluid according to the invention and as described above.

The invention also relates to an aircraft comprising at least one such turbine engine.

The present invention also relates to a method for controlling such a system for pumping and metering a fluid, a first control way comprising a first acquisition unit, the first regulation loop of the electronic computer and at least the electric motor of the first motor pump and a second control way comprising a second acquisition unit, the second regulation loop of the electronic computer and at least the electric motor of the second motor pump, the method being characterised in that it comprises the steps consisting in:
a) authorizing the first control way comprising the first regulation loop to control at least the first motor pump;
b) establishing a hydraulic power or flow rate setpoint for at least the first motor pump of the first control way authorised by the first regulation loop from data supplied by at least the first acquisition unit of the first authorised control way; and
c) in the event of failure of at least one element chosen from the list comprising the first acquisition unit, the first regulation loop and at least the electric motor or the pump of the motor pump of the first authorised regulation way, transferring the control authorisation from the first control way to the second control way, and establishing a hydraulic power or flow rate setpoint for at least the motor pump of the second control way authorised by the second regulation loop from data supplied by at least the second acquisition unit of the second authorised control way.

In nominal operation, both motor pumps are commanded to supply the required flow rate. In this case, the power required for pumping is divided between the two motor pumps. This means that if one of the motor pumps fails, the other is already commanded at the rotational speed suitable for the required flow rate. There is therefore no disruption to the flow rate when the failure occurs. Moreover, it's not even necessary to detect the failure of one motor pump in order to adapt the command of the other.

In addition, the control method according to the invention allows a flow rate or hydraulic power to be shared between the motor pumps, with the advantageous technical effects of allowing the dimensioning of the motor pumps to be optimised, improving their ageing and their response time in the event of fault of an element of the control way with authority.

The control method according to the invention may comprise one or more of the following characteristics, which may be taken in isolation from one another or in combination with one another:

- each regulation loop of a control way is designed to control a single electric motor;
- each regulation loop of a control way is able to control the first and second electric motors;
- the establishment of a flow rate or hydraulic power setpoint comprises a step consisting in establishing a distribution of hydraulic power or of flow rate to be supplied to the turbine engine between the two electric motors;
- the flow rate or hydraulic power to be supplied is equally distributed between the two electric motors;
- the first regulation loop and the second regulation loop are adapted to exchange data;
- in the event of failure of at least one element of the first control way authorised from among the first regulation loop, the first electric motor and the first pump, the flow rate or hydraulic power setpoint is applied in full to the second electric motor;
- each control way is adapted to control the first electric motor and the second electric motor, and the first regulation loop is configured to jointly control the first electric motor and the second electric motor according to the flow rate or hydraulic power setpoint established, except in the event of failure of at least one element of the first authorised control way;
- in the event of failure of at least one element of the first control way from among the first regulation loop and the first acquisition unit, the second regulation loop is connected and configured to jointly control the first electric motor and the second electric motor according to a flow rate or power setpoint established by the second regulation loop of the second control way to which the authorisation is transferred;
- in the event of failure of a pump or of the first electric motor, the flow rate or hydraulic power setpoint is such that the other pump connected to the second electric motor supplies the flow rate or hydraulic power in full to the turbine engine;
- the control method comprises a preliminary step during which, when the turbine engine is started up and until an idle speed is established, only one pump supplies the power in full to the turbine engine;
- the control method comprises a step of alternating the pump supplying the full power required each time the turbine engine is started;
- the flow rate or power distribution is established as a function of at least one factor from among the operating point of the turbine engine, the state of health of each regulation loop of the computer, the state of health of each motor pump, the margin on shutdown or pumping, the current acceleration/deceleration, the power supplied by the turbine engine, the flight conditions;
- the control method comprises a step of monitoring the efficiency of the electric motors and of the pump or the pumps;
- the fluid is fuel or lubricating oil.

BRIEF DESCRIPTION OF THE FIGURES

Further characteristics and advantages of the invention will become apparent from the following detailed description, for the understanding of which reference is made to the attached drawings in which.

In the various figures, the similar elements are designated by identical references. In addition, the various elements are not necessarily shown to scale in order to present a view allowing to facilitate the understanding of the invention.

By convention, in this application, the terms "upstream" and "downstream" are defined in relation to the circulation orientation of the fluid in a pump.

DETAILED DESCRIPTION OF THE INVENTION

Although the example described relates to a fuel pumping and metering system configured to generate a flow rate of fuel, it is clear that this example is not limitative and that the invention also applies to any other system for generating hydraulic power from an aeronautical fluid, requiring more or less accuracy control. For example, the invention could apply to a fuel boost pressure generation system located upstream of a main hydraulic power generation system, or to an oil flow rate generation system used for the lubrication or the cooling of the turbine engines.

The invention proposes a system for pumping and metering a fluid, in particular for a turbine engine, comprising two hydraulic pumps for the fluid, each configured to be driven by an electric motor and to be controlled by a two-channel electronic computer for controlling the electric motors driving the pumps.

Figure 1:
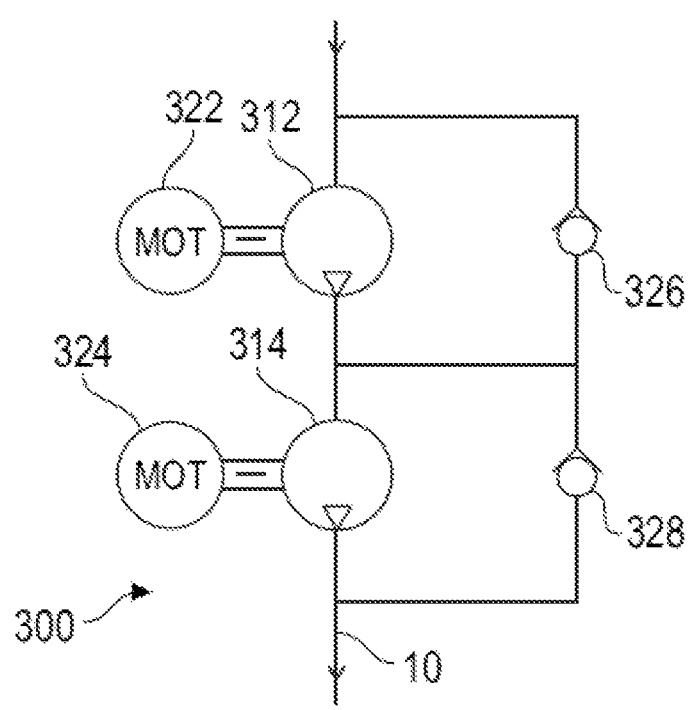
FIG. 1 is a schematic view of a system for pumping and metering a fluid according to one embodiment of the invention.

FIG. 1 illustrates an embodiment of a pumping and metering system 300 according to the invention, with two hydraulic pumps 312, 314 arranged in series between a fluid reservoir (fluid inlet) and a member of the turbine engine to be fed with fluid.

Each pump 312, 314 is driven by a respective and dedicated electric motor, 322, 324. In other words, the first pump 312 is driven by an electric motor referred to as the first electric motor 322 and the second pump 314 is driven by another electric motor, referred to as the second electric motor 324.

Each hydraulic pump 312, 314 may be, for example, a centrifugal pump or a positive displacement pump, for example of the gear, vane or gerotor type, or any other pump technology allowing hydraulic power to be generated.

Each electric motor 322, 324 is fed by an electrical power source not shown in FIG. 1.

An electric motor can also be integrated into a hydraulic pump. Such an assembly is referred to as a motor pump.

In the remainder of this description, we refer to a motor+pump assembly as a motor pump.

Advantageously, two non-return devices 326, 328 for avoiding the return of the flow rate are provided, such as a non-return valve or any other member allowing this function to be carried out. Each non-return device 326, 328 for avoiding the return of the flow rate is arranged in parallel on a respective pump. The two valves are arranged in series between the fluid reservoir and the member to be fed. These non-return devices 326, 328 for avoiding the return of the flow rate allow to compensate for any differences in flow rate between the two pumps, or ensure a preferred path for the fluid if one of the pumps is stopped (bypass).

The pumping and metering system 300 also comprises an electronic computer (not shown in FIG. 1) to control the electric motors commanding the pump.

The electronic computer comprises mutually independent regulation loops, supplying a control command or setpoint to each electric motor of the pumping and metering system.

Preferably, each regulation loop establishes its control setpoint on the basis of data supplied by an assembly of respective sensors.

In the case of advanced pumps incorporating electronics and sensors, for example for fluid speed or temperature, this data can also be transmitted to the electronic computer via an ad hoc communication interface, for example a digital connection, so that it can be taken into account in the regulation loops.

Two ways for controlling/commanding the hydraulic pumps have thus been established, allowing the implementation of a redundant electronic control capable of meeting the safety requirements imposed. Each regulation way includes an assembly of sensors supplying input data, a regulation loop of the electronic computer, an electric motor until an hydraulic pump.

Figure 2:
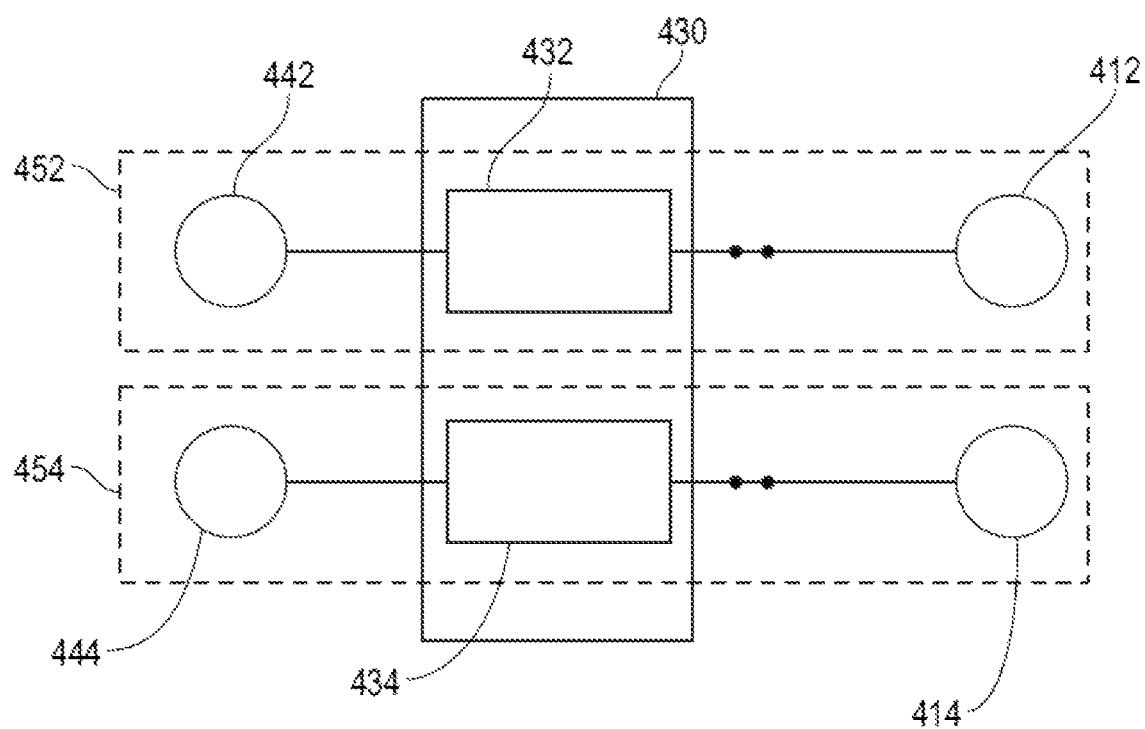
FIG. 2 illustrates a generalised system for pumping and metering a fluid in accordance with the invention, adapted to implement a control method in accordance with the invention.

FIG. 2 illustrates a pumping and metering system 400 according to the invention, comprising two electric motors for controlling the distribution of fluid towards the member to be fed, in particular by controlling the fluid flow rate. Each electric motor drives an own pump, the motor+pump assembly being referred to as a motor pump in the remainder of the description.

The pumping and metering system 400 therefore comprises two motor pumps 412, 414. The motor pumps 412, 414 are arranged in series as shown in FIG. 1.

Each motor pump 412, 414 has its own regulation loop 432, 434 of an electronic computer 430. Each regulation loop receives its own data from an acquisition unit, 442, 444, to establish a power setpoint for the associated motor pump, 412, 414. The data is supplied by one or more external sensors, and/or by each pump, when the pumps incorporate a corresponding electronics.

In other words, the electronic computer 430 comprises a first regulation loop 432 supplying a control command or setpoint to the first electric motor of the first motor pump 412 and a second independent regulation loop 434 supplying a control command to the second electric motor of the second motor pump 414.

The electronic computer 430 is configured to determine the flow rate of the fluid to be distributed by each motor pump from the data acquired by these acquisition units 442, 444, in each of the two regulation loops.

Such an architecture defines two control ways 452, 454, each with its own acquisition unit 442, 444, its own regulation loop 432, 434 of the computer and its own motor pump 412, 414. In other words, a first control way 452 comprises the first acquisition unit 442, the first regulation loop 432 of the computer and the first motor pump 412. Similarly, a second control way 454 comprises the second acquisition unit 444, the second regulation loop 434 of the computer and the second motor pump 414.

Such an architecture of a pumping and metering system according to the invention allows the implementation of an improved control method, integrating a management of the failures that satisfies the safety criteria imposed in the vehicles in the aeronautical field etc.

Such an improved method according to the invention will now be described in detail with reference to FIG. 3.

Figure 3:
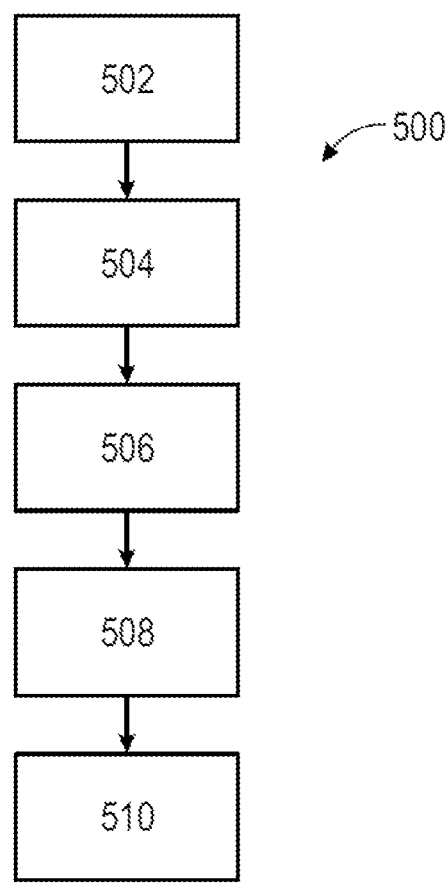
FIG. 3 is a block diagram illustrating the steps of an embodiment of a method for controlling a system for pumping and metering a fluid according to the invention.

FIG. 3 illustrates the steps of a control method 500 according to the invention of the pumping and metering system 400 of FIG. 2, in which each regulation loop 432, 434 is intended to control at least one electric motor or motor pump 412, 414.

The method 500 comprises at least the following steps:

In a step 502, allowing one control way among the first control way 452 and the second control way 454 to control at least one of the motor pumps 412, 414. In other words, this control way has "full authority", it is the only control way that can establish flow rate or hydraulic power setpoints in order to control the motor pump or motor pumps 412, 414 during operation of the turbine engine. In the following, we will refer to the regulation loop of the control way with full authority as "the regulation loop with authority".

Subsequently, the first control way 452 is arbitrarily chosen as the way with authority or control way.

Receiving, by the first regulation loop 432 of the electronic computer 430, acquisition data from at least the acquisition unit of the authorised control way, here the first acquisition unit 442, during a step referenced 504.

During a step 506, the regulation loop of the authorised control way, in this case the first regulation loop 432, determines, from the acquisition data received, the flow rate of the fluid or the hydraulic power to be supplied to the turbine engine by at least the motor pump of the authorised control way.

The first regulation loop 432 then establishes, in a step 508, a flow rate or hydraulic power setpoint for at least the motor pump of the authorised control way on the basis of the flow rate of the fluid or of the hydraulic power determined.

In the event of failures of at least one element of the authorised control way, i.e. of the acquisition unit, of the regulation loop, of the electric motor or motor pump of the authorised control way, the control authorisation is transferred to the other control way, in this case the second control way 454, during a step referred to as 510. In this way, the first control way 452 no longer has the authority to control the motor pump or motor pumps. Only the second control way 454 has "full authority" and can establish flow rate or power hydraulic setpoints so as to control the motor pump or motor pumps 412, 414 during the operation of the turbine engine.

FIGS. 4 to 6 illustrate three different embodiments of this control method. More specifically, each FIGS. 4 to 6 illustrates a decision matrix corresponding to an embodiment of the control method, these decision matrices illustrating a normal operation of the control way with authority and three different cases of failure that may occur in this control way. In the first embodiment shown in FIG. 4, comprising FIGS. 4A to 4D, each regulation loop 432, 434 is designed to control a single electric motor or motor pump 412, 414.

In the second embodiment shown in FIG. 5 (grouping together FIGS. 5A to 5D), the regulation loops 432 and 434 of the computer advantageously communicate with each other via an "inter-way" connection 460 between the two regulation loops, allowing data to be exchanged between the two control ways.

The third embodiment of the invention illustrated in FIG. 6 (grouping together FIGS. 6A to 6D) corresponds to an improved control method in which each regulation loop 432, 434 is empowered to control jointly and directly the two motor pumps 412, 414 of the system.

In these figures, the elements of the pumping and metering system shown in bold lines are operational and active, those shown in dotted lines are faulty and the others are inactive or on standby. The authoritative control way is therefore the control way whose regulation loop is shown in bold line.

The three embodiments of the method will now be described in detail.

FIGS. 4A to 4D illustrate a decision matrix of a first embodiment of the control method in which each regulation loop 432, 434 is intended to control a single electric motor or motor pump 412, 414.

Figure 4A:
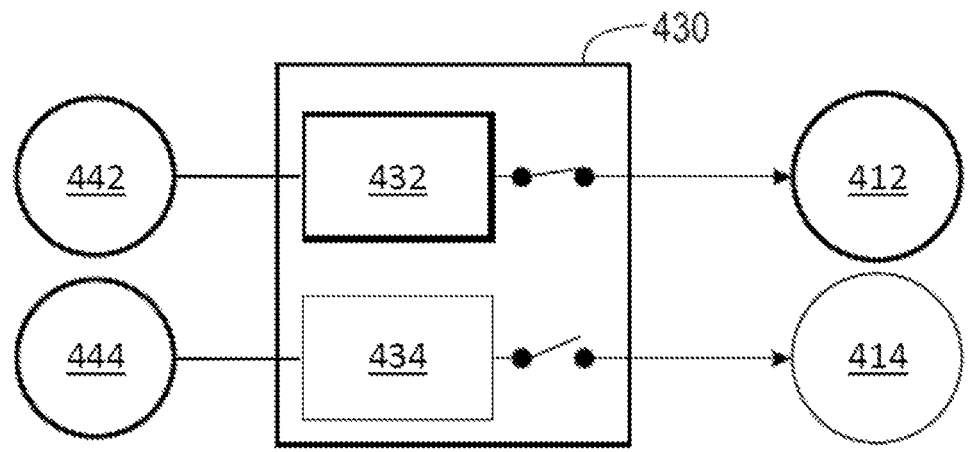
FIG. 4A illustrates a control method according to a first embodiment of the invention in normal operation.
Figure 4B:
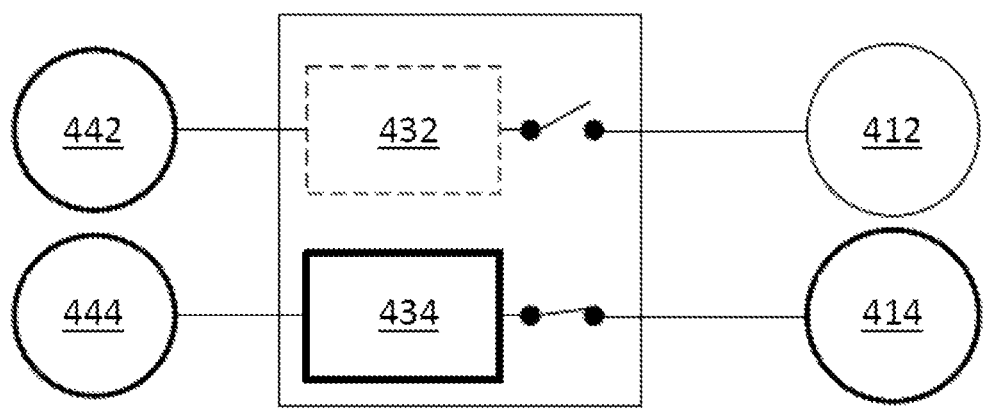
FIG. 4B illustrates the control method according to the first embodiment of the invention in the event of a failure of a channel of the computer.
Figure 4C:
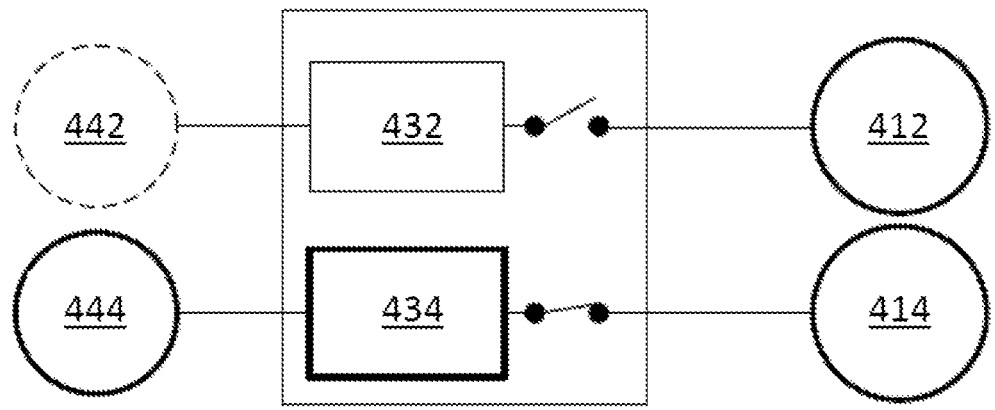
FIG. 4C illustrates the control method according to the first embodiment of the invention in the event of failure of a sensor.
Figure 4D:
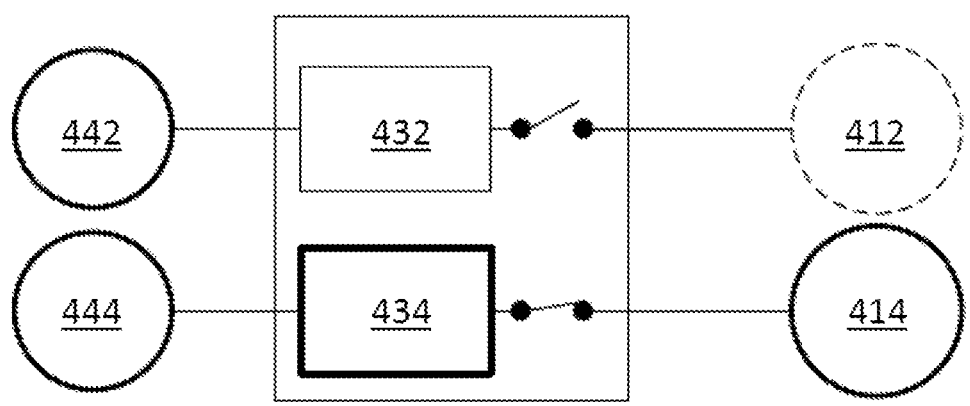
FIG. 4D illustrates the control method according to the first embodiment of the invention in the event of a motor pump failure.

FIG. 4A shows the normal operating case in which all the elements of the control way are operational, i.e. all the elements of the first control way 452 which in this illustrated example has authority.

The second control way 454 is on standby. In practice, to say that the control way 454 is on stand-by means that the output signal from the regulation loop 434 is not applied to the second motor pump 414, as shown by a switch in the open position. In other words, the second regulation loop 434 has no authority to control the second motor pump 414.

In this case, the first motor pump 412 supplies the entirety of the flow rate or of the hydraulic power required by the turbine engine, based on the power or flow rate setpoint established by the first regulation loop 432 of the control way which has authority.

In the event of failure in the way in control, i.e. the control way with authority (regulation loop in bold in the figures), whether this is a fault in the regulation loop 432 (FIG. 4B), of the acquisition unit 442 or of one of its essential sensors (FIG. 4C) or of the motor pump 412 (motor and/or pump) (FIG. 4D) of the way in control: the control ways in standby and in control are switched. In this way, the control authorisation is transferred from the first control way 452 to the second control way 454. The first control way 452 is then on standby, as shown by a switch in the open position at the output of the first regulation loop 432, while the switch at the output of the second regulation loop 434 is in the closed position.

The second control way 454 has full authority to control the second motor pump 414 by establishing a flow rate or hydraulic power setpoint from the data transmitted by the second acquisition unit 444. The second regulation loop 434 controls the motor pump 414, which then supplies all the hydraulic power required to operate the turbine engine.

In practice, this step of transferring authority or switching control way in the event of failure of an element of the control way having authority may result in a non-negligible transient regime, due to the time required for the second motor pump 414 to take over the entire power load previously performed by the first motor pump 412.

Nevertheless, this method meets a philosophy of control and therefore of failure management of the current aeronautical turbine engines in a control way with a regulation loop having control authority over only one motor pump.

FIGS. 5A to 5D show a matrix of decisions corresponding to a second embodiment of the control method shown in FIG. 3, advantageously allowing the duration of the transient regime to be reduced. This second embodiment is particularly suitable for pumping and metering systems in which the two regulation loops 432, 434 of the electronic computer 430 are adapted to exchange data via an "inter-way" connection 460. For example, the data exchanged are measurements or diagnostic data supplied by the acquisition units 442, 444 or a setpoint established by a regulation loop of the control way in control to control the motor pump of the other control way.

According to this embodiment of the method, during step 504 (FIG. 3) the authoritative control way (i.e. the first control way 452) receives data from both the first acquisition unit 442 and the second acquisition unit 444. Then the regulation loop 432 of the first control way 452 (having authority) determines from these data the flow rate of the fluid or the hydraulic power to be supplied to the turbine engine by each of the motor pumps 412, 414 (step 506 of FIG. 3) and establishes a flow rate or hydraulic power setpoint for each motor pump 412, 414 in order to be able to control them simultaneously for operation of the turbine engine (step 508 of FIG. 3). In other words, the regulation loop 432 of the first control way 452 (with authority) determines a distribution of the flow rates or hydraulic power to be supplied to the turbine engine by each electric motor or motor pump 412, 414, based in particular on the data exchanged between the two regulation loops via the inter-way connection 460.

The second regulation loop 434, of the standby control way 454, can in this case be enabled to control the second motor pump 414, with limited authority, to supply some of the flow rate or of the hydraulic power required by the turbine engine. Limited authority means that the second regulation loop 434 of the standby control way 454 controls the second motor pump 414 on the basis of the setpoint established by the first regulation loop 432 of the first control way 452 (having full authority). The second regulation loop 434 of the standby control way 454 does not establish the setpoint for controlling the second motor pump 414, but receives it from the first regulation loop 432.

This embodiment of the method allows to reduce the duration of the transient regime in the event of transfer of authority or switch of way.

Figure 5A:
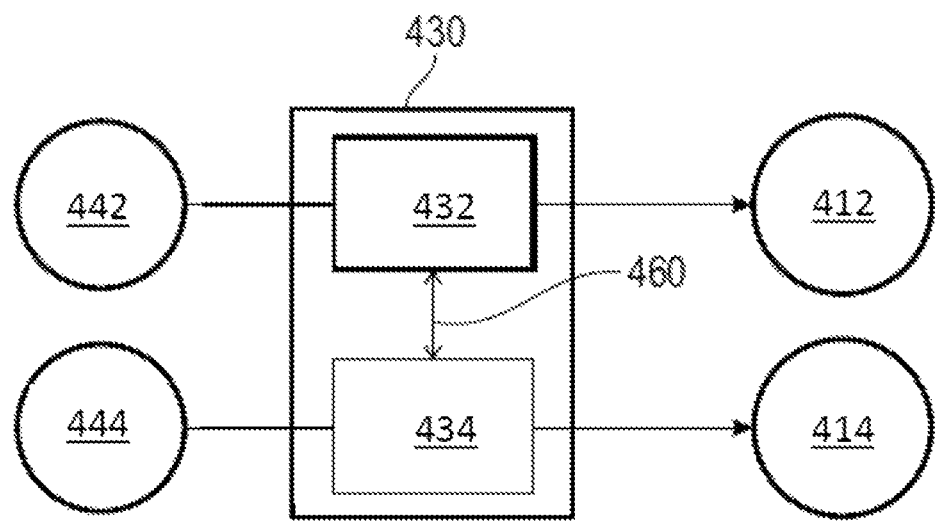
FIG. 5A illustrates a control method according to a second embodiment of the invention in normal operation.
Figure 5B:
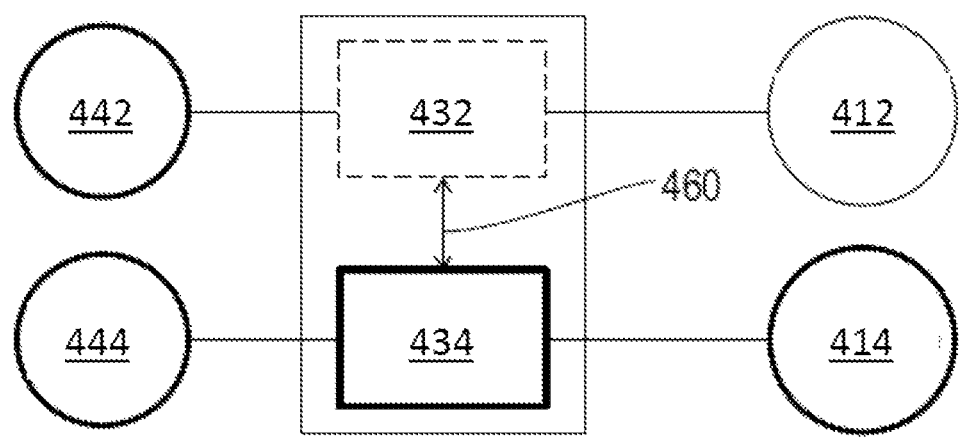
FIG. 5B illustrates the control method according to the second embodiment of the invention in the event of failure of a channel of the computer.
Figure 5C:
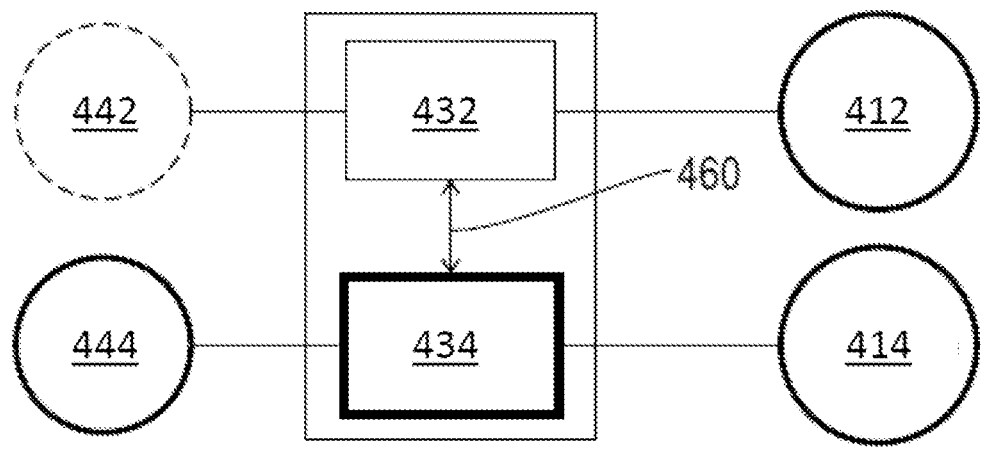
FIG. 5C illustrates the control method according to the second embodiment of the invention in the event of a sensor failure.

In the situation shown in FIG. 5A (normal case), the authoritative control way is the first control way 452 (shown in bold) which determines the total flow rate or hydraulic power required by the turbine engine and distributes it between the two active motor pumps 412, 414. The second regulation loop 434 of the second control way 454 is on standby, with "limited authority", to transmit the flow rate or hydraulic power setpoint established by the first regulation loop 432 to the second motor pump 414 in order to control it.

Figure 5D:
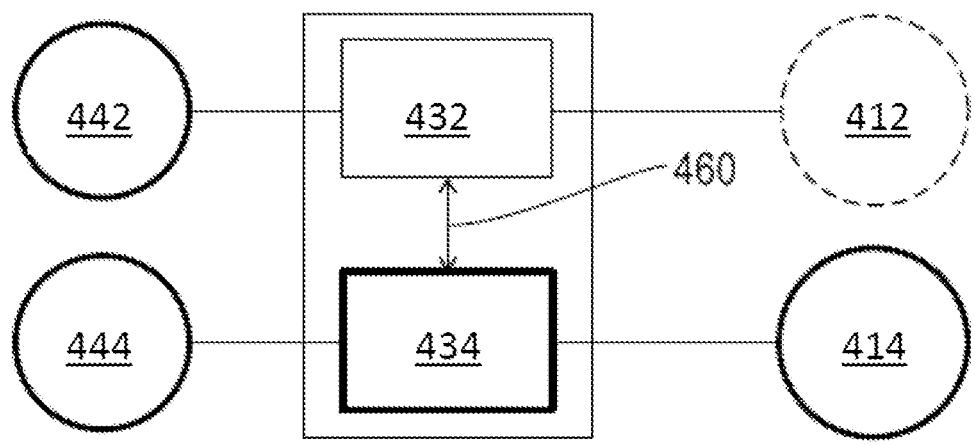
FIG. 5D illustrates the control method according to the second embodiment of the invention in the event of a motor pump failure.

In the event of a failure in the control way 452, of the first regulation loop 432 or of the associated first motor pump 412, as illustrated in FIGS. 56 and 5D by dotted lines, the control authority and consequently the establishment of the flow rate or hydraulic power setpoints are transferred from the first regulation loop 432 to the second regulation loop 434, which becomes the regulation loop of the control way having authority.

In this case, only the second motor pump 414 remains active and supplies all the flow rate or the hydraulic power required to operate the turbine engine, and the second regulation loop 434 ("having authority") establishes a setpoint to this effect. As the second motor pump 414 was already in operation or "on load", it experiences a less pronounced transient regime than in the first embodiment of the control method shown in FIGS. 4A to 4D.

In the event of failure of the first acquisition unit 442 (shown in dotted lines) of the authoritative control way 452 (FIG. 5C), i.e. upstream of the regulation loop 432, there is also a transfer of control authority from the first control way 452 to the second control way 454. In this way, the second regulation loop 434 of the control way determines the total flow rate or hydraulic power required by the turbine engine and distributes it between the two active motor pumps 412, 414. The first regulation loop 432 of the first control way 452 is then on standby, with a "limited authority", to transmit the flow rate or hydraulic power setpoint established by the second regulation loop 434 to the first motor pump 412 in order to control it. Each regulation loop continues to control its associated motor pump.

FIGS. 6A to 6D show a decision or control matrix corresponding to a third, improved embodiment of the control method shown in FIG. 3. This third embodiment of the method is particularly suited to pumping and metering systems in which each regulation loop 432, 434 is electrically connected to both motor pumps 412, 414 and enabled to jointly control both motor pumps 412, 414 of the pumping and metering system. The two regulation loops 432, 434 of the electronic computer 430 can also be adapted to exchange data via an "inter-way" connection 460.

Figure 6A:
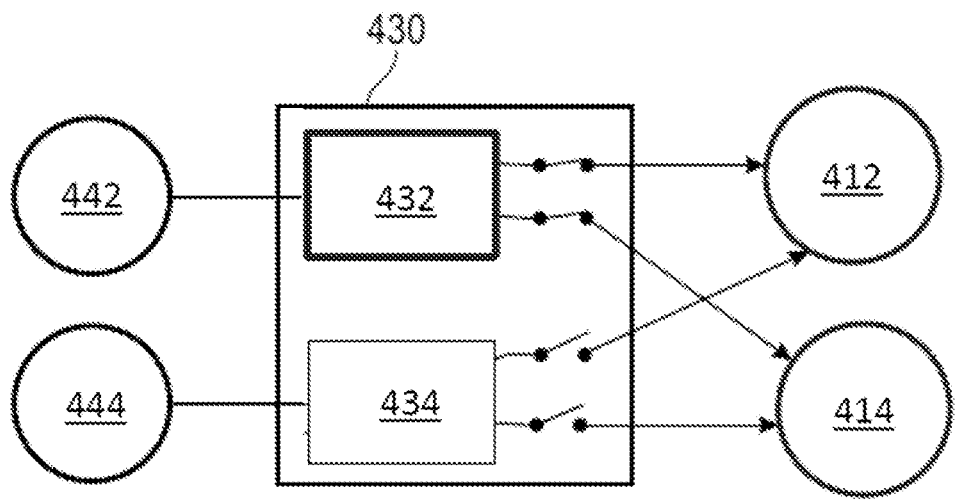
FIG. 6A illustrates a control method according to a third embodiment of the invention in normal operation.

Referring to FIG. 6A relative to the case of normal operation, the control way with authority (shown in bold line) is the first control way 452 whose regulation loop 432 is connected to the two motor pumps 412, 414.

During step 506 (FIG. 3), the first regulation loop 432 determines the flow rate of the fluid or the hydraulic power to be supplied to the turbine engine by each of the motor pumps 412, 414 from data from at least the first acquisition unit 442. In other words, the regulation loop 432 of the first control way 452 (with authority) determines a distribution of the flow rates or hydraulic powers to be supplied to the turbine engine by each electric motor or motor pump 412, 414. It then establishes a flow rate or hydraulic power setpoint for each motor pump 412, 414 so that they can be controlled directly and simultaneously to operate the turbine engine (step 508 in FIG. 3).

During this time, the second regulation loop 434 of the standby way 454 does not establish any control setpoint for the motor pumps and does not control any of the motor pumps as shown by the switches in the open position connected respectively to the first motor pump 412 and to the second motor pump 414 at the output of the second regulation loop 434.

In the event of a failure in the authoritative control way 452 of at least one element upstream of the motor pump, i.e. of the regulation loop 432 (FIG. 6B) and/or of the acquisition unit 442 (FIG. 6C), the control authority and consequently the establishment of the flow rate or hydraulic power setpoints are transferred from the first regulation loop 432 to the second regulation loop 434, which becomes the regulation loop of the authoritative control way. This is illustrated by the passage of the switches connected respectively to the motor pumps 412, 414 at the output of the first regulation loop 432 changing from the closed position to the open position.

In this way, the regulation loop 434 of the second control way 454 (with authority) determines a distribution of the flow rates or hydraulic power to be supplied to the turbine engine by each electric motor or motor pump 412, 414. It then establishes a flow rate or hydraulic power setpoint for each motor pump 412, 414 so that they can be controlled directly and simultaneously to operate the turbine engine.

Figure 6B:
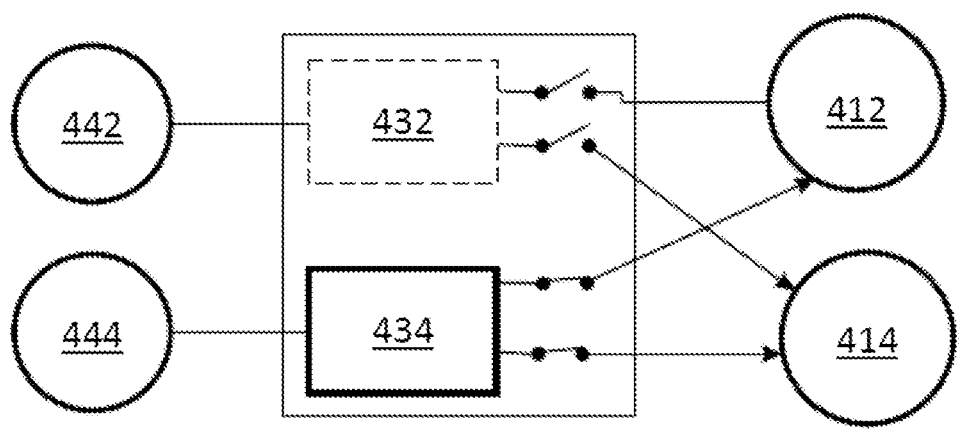
FIG. 6B illustrates the control method according to the third embodiment of the invention in the event of a failure of a channel of the computer.
Figure 6C:
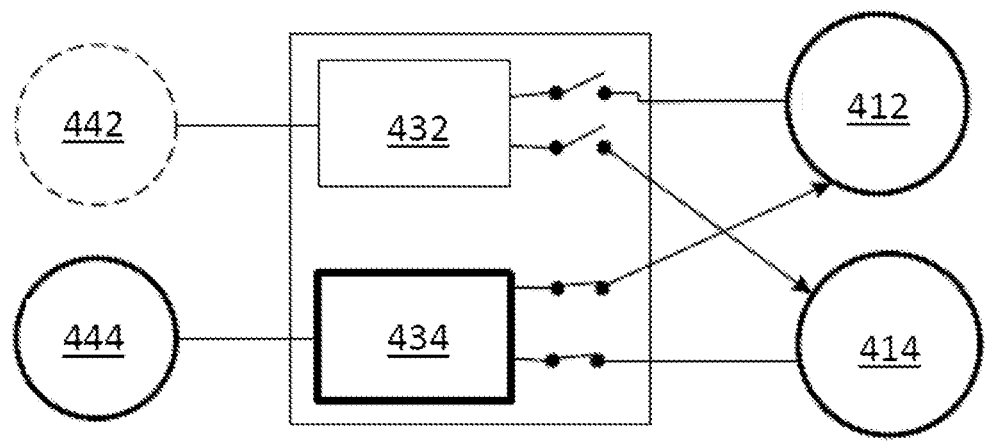
FIG. 6C illustrates the control method according to the third embodiment of the invention in the event of a sensor failure.
Figure 6D:
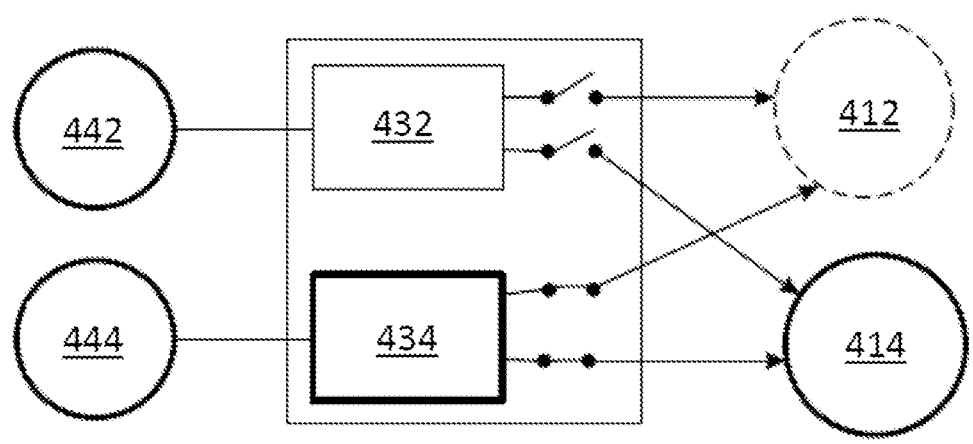
FIG. 6D illustrates the control method according to the third embodiment of the invention in the event of a motor pump failure.

Starting from one of these situations in FIG. 6B or 6C, and also in the event of failure of one of the motor pumps (in the case illustrated in FIG. 6D, the first motor pump 412 has failed), the second regulation loop 434 of the control way has authority (control way 454) is able to establish a flow rate or hydraulic power setpoint to control the second motor pump 414, the only functional motor pump, so that the latter supplies the entirety of the flow rate or of the hydraulic power required for the turbine engine to operate.

In a similar way, if it is the second motor pump 414 that is faulty, the regulation loop 434 is also able to establish a flow rate or hydraulic power setpoint to control the first motor pump 412, the only functional motor pump, so that it supplies the entirety of the flow rate or of the hydraulic power required for the turbine engine to operate.

This also applies from the situation of the case illustrated in FIG. 6A, in which the first control way 452 has authority: if one of the motor pumps fails, the first regulation loop 432 of the control way having authority is able to establish a flow rate or hydraulic power setpoint to control the other of the motor pumps which is still operational, so that the latter supplies the entirety of the flow rate or of the hydraulic power required for the turbine engine to operate.

As in the case of the second embodiment of the method, the transient regime is improved because the motor pump or motor pumps still in operation were already in operation.

Figure 7:
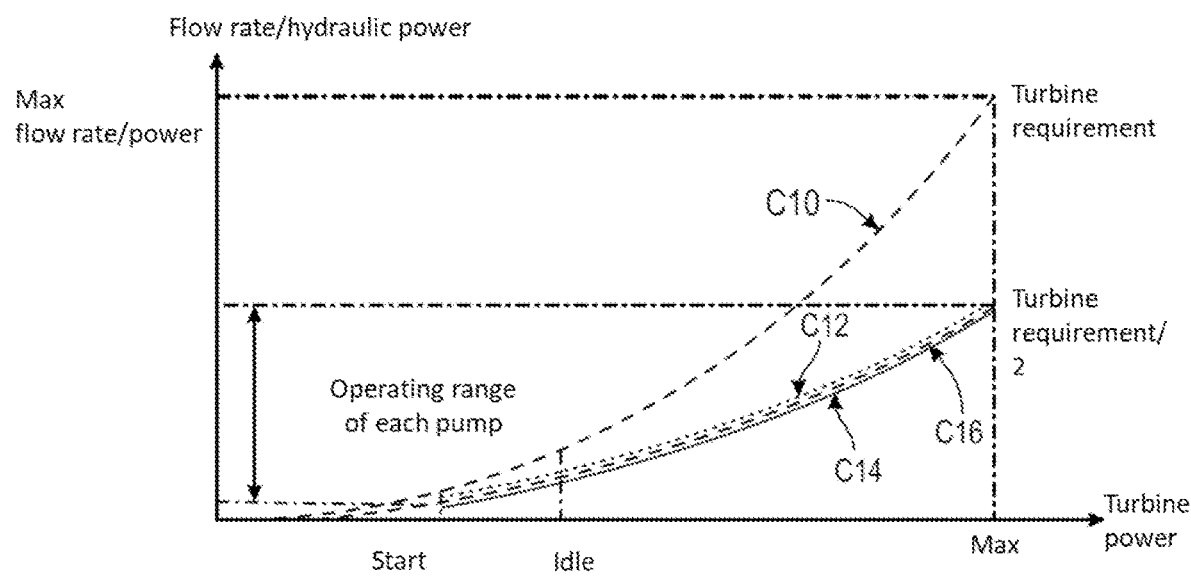
FIG. 7 illustrates an example of load law for the motor pumps applicable to the control methods of FIGS. 5 and 6 in "fully operational" operating mode.
Figure 8:
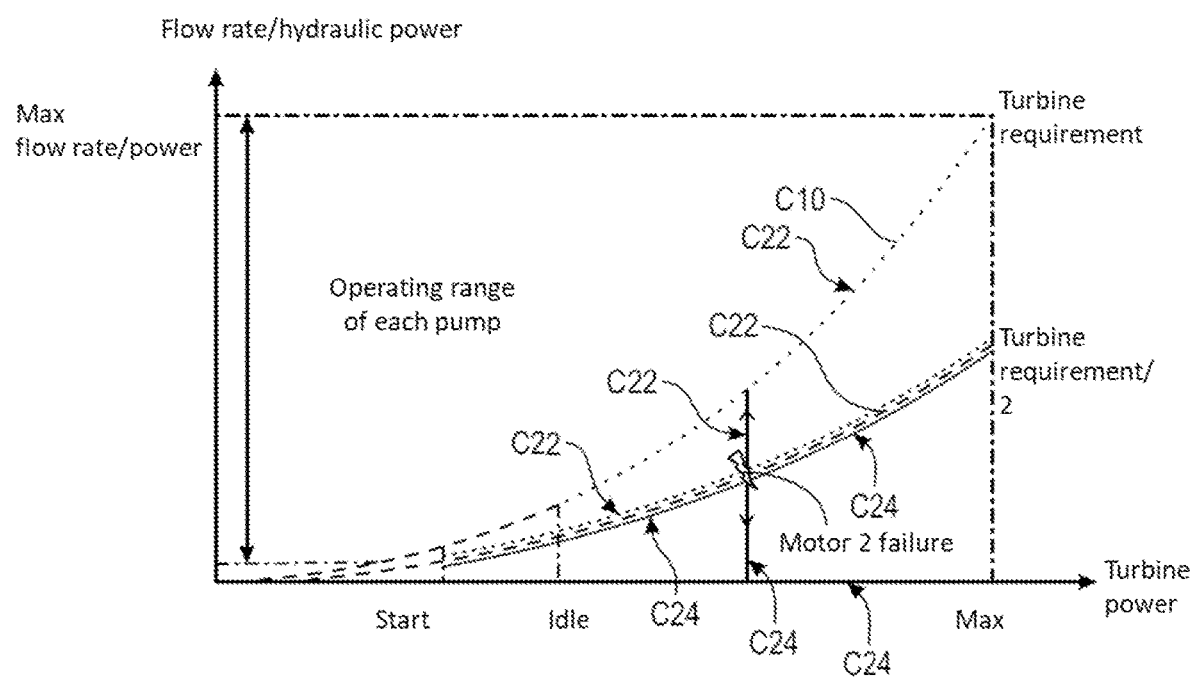
FIG. 8 illustrates an example of load law for the motor pumps applicable to the control methods of FIGS. 5 and 6 in the event of failure of one of the motor pumps.

FIGS. 7 and 8 illustrate the load laws of the two motor pumps corresponding to the decision matrices of the second and third embodiments of the control method described above (FIGS. 5 and 6) in the case of an equitable distribution of the power between the two motor pumps: FIG. 7 for an "all operational" operating mode and FIG. 8, in the event of failure of one of the motor pumps. FIGS. 7 and 8 each show a graph showing the evolution in the total flow rate or hydraulic power (curve referenced C10) available to the turbine engine, the evolution in the flow rate or hydraulic power of the first motor pump (curves referenced C12, C22), the evolution in the flow rate or hydraulic power of the second motor pump (curves referenced C14, C24) and the evolution in the nominal flow rate or nominal hydraulic power for each motor pump (curve referenced C16) as a function of the power of the turbine engine, from the start-up to the maximum power of the turbine engine.

In FIG. 7, the distribution of hydraulic power or flow rate to be supplied being equitable between the two motor pumps 412, 414, they follow the same load law for the start-up of the turbine to the maximum operating power of the turbine engine when everything is operational.

With reference to FIG. 8, when one of the motor pumps, in this case the second motor pump 414, fails after the start-up phase of the turbine, the flow rate or hydraulic power supplied by the second motor pump becomes zero (curve referenced C24) while the other motor pump 412 takes over and then supplies the entirety of the flow rate or hydraulic power required to operate the turbine engine (curve referenced C24). Each motor pump is then sized to supply the entirety of the power required by the turbine engine.

For both the second and the third embodiment of the control method, the distribution of flow rate or hydraulic power to be supplied by the two motor pumps may be equitable or arbitrary. For example, one motor pump can supply the power corresponding to the anti-extinction flow rate of the turbine engine and the other the remainder.

The flow rate distribution can be established as a function of the operating point of the turbine engine, the state of health of each regulation loop of the electronic computer, the state of health of each motor pump, the margin on shutdown or pumping, the current acceleration/deceleration, the power supplied by the turbine engine, the flight conditions or a combination of all these factors.

Figure 9:
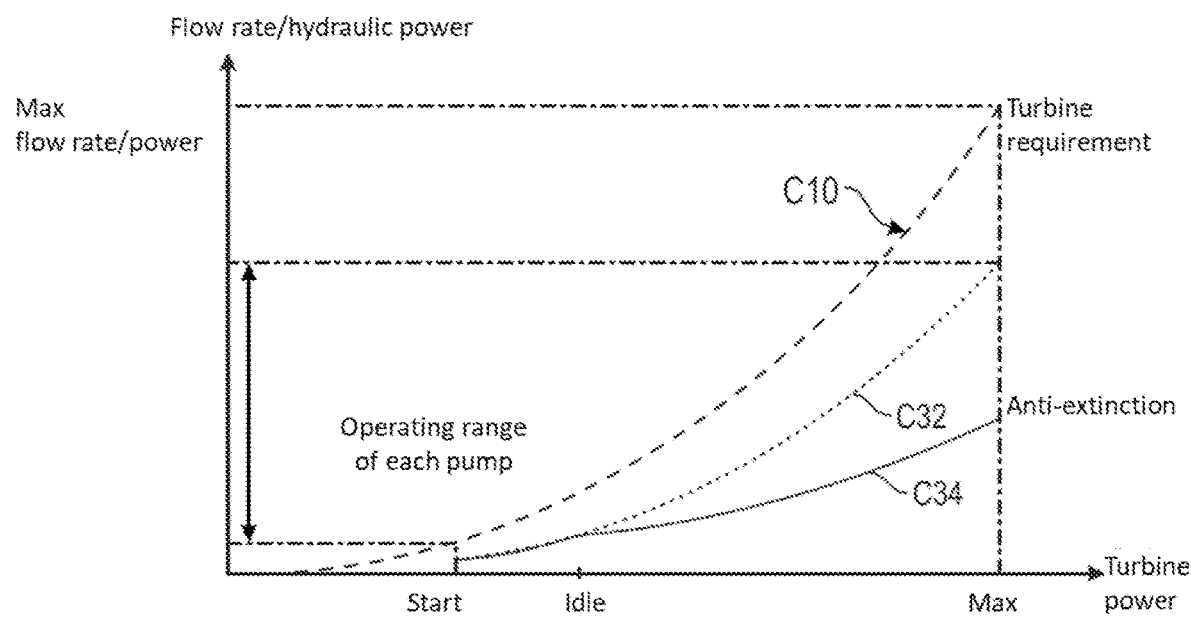
FIG. 9 illustrates another example of load law for the motor pumps as a function of the operating phase of the turbine engine for the control methods of FIGS. 5 and 6.

FIG. 9 graphically represents the evolution of the flow rate or total hydraulic power (curve C10) available to the turbine engine, the evolution of the flow rate or hydraulic power of the first motor pump (curve referenced C32), the evolution of the flow rate or hydraulic power of the second motor pump (curve referenced C34) as a function of the power of the turbine engine, from the start-up to the maximum power of the turbine engine when everything is operational and in the case of a static distribution, depending solely on the power of the turbine engine. In this example, the power supplied by the second motor pump (curve referenced C34) corresponds, from the idle speed of the turbine engine, to the flow rate or hydraulic power to prevent the turbine engine from shutting down and the first motor pump supplies the additional flow rate or hydraulic power (curve referenced C34). It is understood that the distribution may depend on the static or dynamic conditions of the operating point mentioned above.

In the case of a non-equitable distribution of the flow rate or of the hydraulic power between the motor pumps, i.e. one of the motor pumps referred to as preferred motor pump supplies a greater flow rate or a power than the other motor pump, the control method according to the invention advantageously comprises a step of alternating the pump referred to as preferred pump each time the turbine engine is started up in order to even out the wear on the two motor pumps.

In addition, during start-up of the turbine engine, the fuel flow rate required by the combustion chamber is very low compared with the flow rates required in flight. Nevertheless, it requires a high level of metering accuracy to allow the combustion chamber to be ignited under good conditions.

In addition, controlling an electric motor can be tricky at low load. Moreover, the accuracy of a low-power pump is difficult to ensure and requires tight manufacturing tolerances, costly matching or adjustments.

Figure 10:
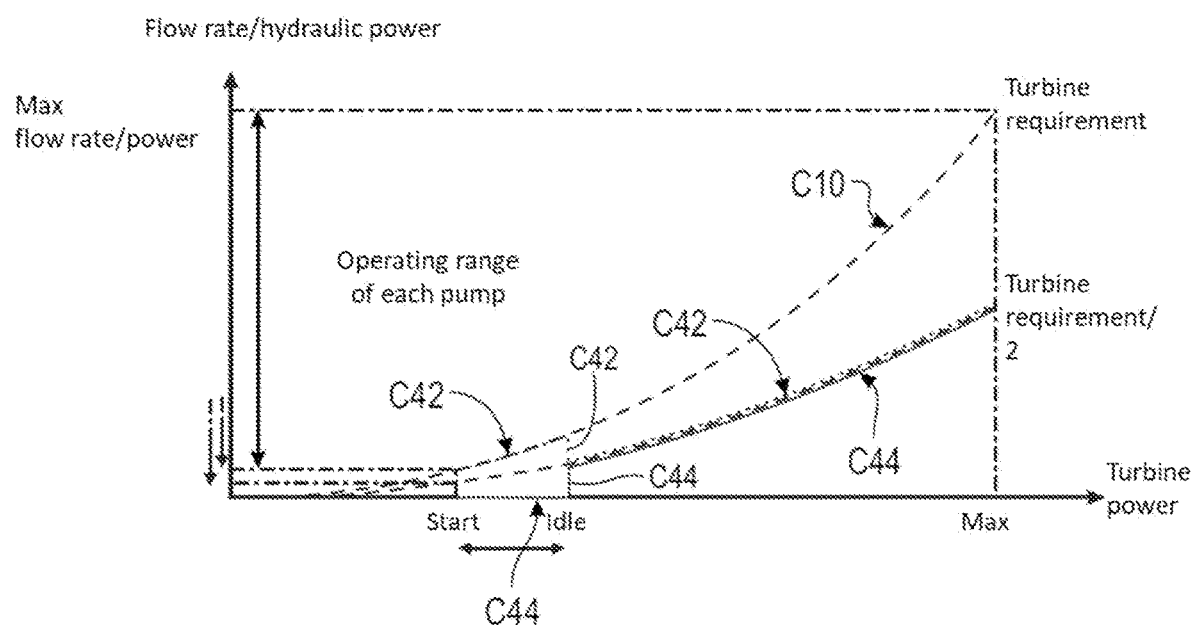
FIG. 10 illustrates another example of load law for the motor pumps between start-up and the idling of the turbine engine for the control methods of FIGS. 5 and 6.

To overcome these disadvantages and thus allow an accuracy of the metering and of the pressurisation, the control method according to the invention comprises a preliminary step during which, when the turbine engine is started up and until an idle speed is established, only one of the motor pumps supplies the entirety of the flow rate or of the power required by the turbine engine, as illustrated in FIG. 10, which shows in graph form the evolution in the total flow rate or hydraulic power (curve referenced C10) available to the turbine engine, the evolution of the flow rate or hydraulic power of the first motor pump (curve referenced C42), the evolution of the flow rate or hydraulic power of the second motor pump (curve referenced C44) as a function of the power of the turbine engine, from start-up to maximum power of the turbine engine when everything is operational and only the first motor pump (curve referenced C42) supplies the entirety of the flow rate or of the power required by the turbine engine from start-up to idle speed of the turbine engine. It is advantageous in this preliminary step to alternate the motor pump used each time the turbine engine is started up in order to even out the wear on the two motor pumps and/or to detect any deterioration of one motor pump.

In addition, a start-up attempt may fail for various reasons. The start-up failure may be due to conditions exogenous to the metering and pressurisation system, such as a fault in the ignition system (spark plugs) in the combustion chamber or a failure of a distribution valve of the fuel; or it may be due to endogenous conditions, i.e. the motor pump used actually fails to follow the flow rate setpoint.

In this case, the control method according to the invention advantageously comprises a step referred to as "second chance start-up" step. When the computer detects an unsuccessful start-up, it switches off the starting accessories (starter, start-up solenoid valve and igniters), waits for the speed of the gas generator to drop sufficiently, then automatically makes a second start-up attempt with the other motor pump, all of this in an automatic manner. If the second start-up attempt is successful with this other motor pump, this may be a sign of a fail-stop or an early warning sign that the first motor pump is deteriorating. It is therefore advantageous to record a corresponding information as data useful for the maintenance.

As already indicated in the description of the various embodiments of a control method according to the invention, each motor pump can be required to supply the entirety of the power required by the turbine engine, and in particular the maximum power required by the turbine engine, so the two pumps and their electric motors are sized accordingly.

In the particular case of application of the invention to a twin-turbine helicopter, i.e. comprising two motor pumps per turbine, i.e. four motor pumps in total, the sizing of the motor pumps must take account of the emergency power regime, referred to as the OEI regime for "One Engine Inoperative". This OEI regime is used when one turbine fails; the other turbine, which is operational, must supply an extra power until the end of the mission. The maximum power of the motor pumps must therefore be increased accordingly, which increases their weight and their cost.

Figure 11:
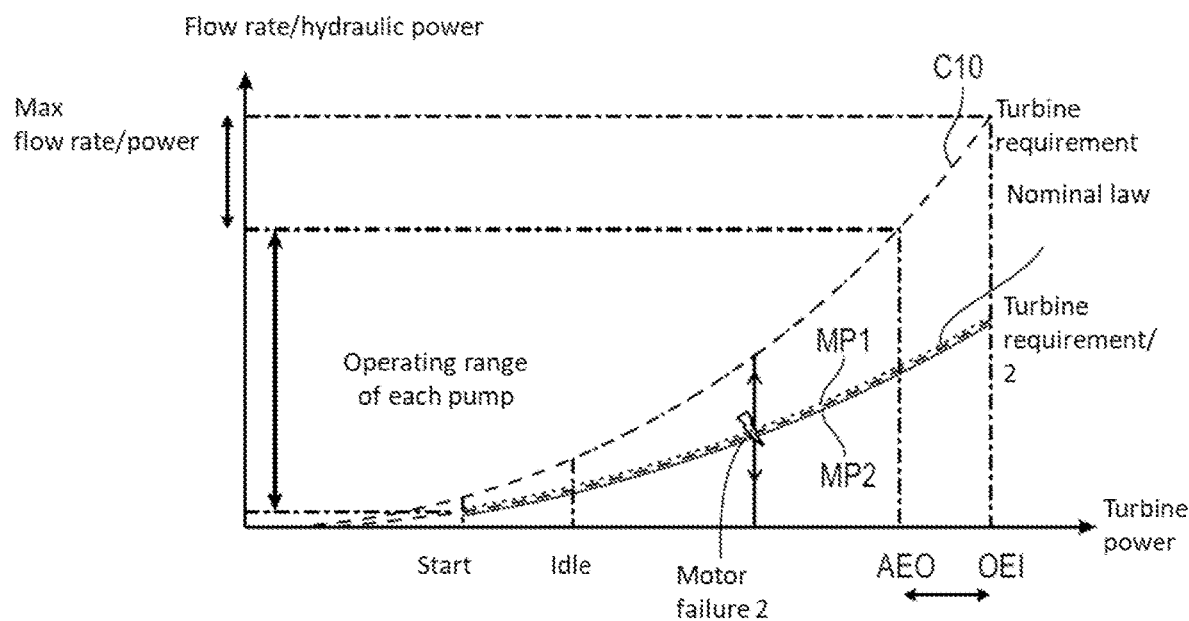
FIG. 11 illustrates an example of load law for the motor pumps for the control methods of FIGS. 5 and 6 in the particular case where there is an emergency power speed.

In order to limit the increase in cost and mass, each motor pump of the pumping and metering system according to the invention is sized to supply only the maximum between:
  the maximum flow rate or power required in the configuration where both turbines are operational (AEO regime, for All Engines Operative),
  half of the maximum OEI flow rate or power required in the event of loss of flow rate/power or failure of the other turbine,
the power or flow rate is distributed between the two motor pumps on the likely assumption that the combination of the events "loss of power in one turbine leading to the need for OEI regime in the other turbine" AND jointly "loss of one motor pump" is highly unlikely. An example of a load law for the motor pumps of a corresponding turbine is shown in FIG. 11.

Advantageously, the control method according to the invention also comprises a step of monitoring the efficiency of the motor pumps by comparing the power of the electric motor with the speed of rotation of the pump to which it is coupled and the power and/or speed of the motor pump with the power of the turbine. This step allows the health state of each motor pump to be monitored.

Preferably, this monitoring step is carried out for the same pump at a given regime or during the start-up of the turbine, at a low flow rate.

The diagnosis of the state of health of the pump can advantageously be carried out by comparing the efficiency of the two pumps at similar regimes or between each start-up, if the motor pumps alternate at start-up.

The three embodiments of a control method according to the invention as described above can advantageously be implemented by a system for pumping and metering a fluid according to the invention as described above.

The second and third embodiments (FIGS. 5 and 6) of the control method according to the invention also allow the flow rate or hydraulic power to be shared between the motor pumps, with the advantageous technical effects of allowing the sizing of the motor pumps to be optimised, improving their ageing and their response time in the event of failure of an element of the control way with authority.

The invention claimed is:

1. A system for pumping and metering a fluid for a turbine engine comprising a first and a second motor pumps for the fluid and an electronic computer configured to determine a flow rate of the fluid to be delivered to the turbine engine, each motor pump comprising a pump and a motor configured to drive the associated pump, the pumping and metering system being wherein the electronic computer comprises a first regulation loop intended to control at least the electric motor of the first motor pump and a second regulation loop intended to control at least the electric motor of the second motor pump, and in which the first pump and the second pump are arranged in series between a fluid reservoir and a member of the turbine engine to be fed with the fluid, each of the first regulation loop and the second regulation loop is enabled to control the first electric motor and the second electric motor.

2. The system for pumping and metering the fluid according to claim 1, configured to generate a flow rate of the fluid, the fluid being fuel or lubricating oil.

3. The system for pumping and metering the fluid according to claim 2, configured to pressurize the fluid, the fluid being fuel intended to feed a main metering system of the turbine engine.

4. The system for pumping and metering the fluid according to claim 1, comprising a first non-return device arranged in parallel with the first pump and a second non-return device arranged in parallel with the second pump.

5. A turbine engine, wherein it comprises at least one system for pumping and metering a fluid according to claim 1.

6. An aircraft comprising at least one turbine engine according to claim 5.

7. The system for pumping and metering the fluid according to claim 1, wherein a first control way comprises a first acquisition unit, the first regulation loop of the electronic computer and at least the electric motor of the first motor pump and a second control way comprises a second acquisition unit, the second regulation loop of the electronic computer and at least the electric motor of the second motor pump, and wherein the system being adapted and configured to:
  a) authorize the first control way comprising the first regulation loop to control at least one of the motor pumps;
  b) establish a hydraulic power or flow rate setpoint for at least the motor pump of the first control way authorized by the first regulation loop from data supplied by at least the first acquisition unit of the first authorized control way; and
  c) in an event of failure of at least one element chosen from the list comprising the first acquisition unit, the first regulation loop and at least the electric motor or the pump of the motor pump of the first authorized control way, transfer the control authorization of the first control way to the second control way, and establish a hydraulic power or flow rate setpoint for at least the motor pump of the second control way authorized by the second regulation loop from data supplied by at least the second acquisition unit of the second authorized control way.

8. A method for controlling a system for pumping and metering a fluid, the system comprising a first and a second motor pumps for the fluid and an electronic computer configured to determine a flow rate of the fluid to be delivered to the turbine engine, each motor pump comprising a pump and a motor configured to drive the associated pump, the pumping and metering system being wherein the electronic computer comprises a first regulation loop to control at least an electric motor of the first motor pump and a second regulation loop intended to control at least an electric motor of the second motor pump, and in which the first pump and the second pump are arranged in series between a fluid reservoir and a member of the turbine engine to be fed with the fluid, a first control way comprising a first acquisition unit, the first regulation loop of the electronic computer and at least the electric motor of the first motor pump and a second control way comprising a second acquisition unit, the second regulation loop of the electronic computer and at least the electric motor of the second motor pump, the method being wherein it comprises the steps consisting in:

a) authorising the first control way comprising the first regulation loop to control at least one of the motor pumps;

b) establishing a hydraulic power or flow rate setpoint for at least the motor pump of the first control way authorized by the first regulation loop from data supplied by at least the first acquisition unit of the first authorized control way; and c) in an event of failure of at least one element chosen from the list comprising the first acquisition unit, the first regulation loop and at least the electric motor or the pump of the motor pump of the first authorized control way, transferring the control authorization of the first control way to the second control way, and establishing a hydraulic power or flow rate setpoint for at least the motor pump of the second control way authorized by the second regulation loop from data supplied by at least the second acquisition unit of the second authorized control way; and wherein each regulation loop of a control way is enabled to control the electric motors of the first and second motor pumps.

9. The control method as claimed in claim 8, wherein the establishment of a flow rate or hydraulic power setpoint comprises a step of establishing a distribution of the hydraulic power or of the flow rate to be supplied to the turbine engine between the two electric motors.

10. The control method according to claim 8, wherein the flow rate or hydraulic power to be supplied is equally distributed between the two electric motors.

11. The control method according to claim 8, wherein the first regulation loop and the second regulation loop are adapted to exchange data.

12. The control method according to claim 8, wherein in the event of failure of at least one element of the first control way authorized from among the first regulation loop, the first electric motor and the first pump, the flow rate or hydraulic power setpoint is applied in full to the second electric motor.

13. The control method according to claim 8, wherein each control way is adapted to control the first electric motor and the second electric motor, and the first regulation loop is configured to jointly control the first electric motor and the second electric motor according to the flow rate or hydraulic power established setpoint except in the event of failure of at least one element of the first authorized control way.

14. The control method as claimed in claim 13, wherein in the event of failure of at least one element of the first control way from among the first regulation loop and the first acquisition unit, the second regulation loop is connected and configured to jointly control the first electric motor and the second electric motor according to the flow rate or hydraulic power setpoint established by the second regulation loop of the second control way to which the authorization is transferred.

15. The control method according to claim 13, wherein in the event of failure of a pump or of the first electric motor, the flow rate or hydraulic power setpoint is such that the other pump connected to the second electric motor supplies the flow rate or hydraulic power in full to the turbine engine.

16. The control method according to claim 15, comprising a preliminary step during which, when the turbine engine is started up and until an idling speed is established, only one pump supplies the hydraulic power in full to the turbine engine.

17. The control method according to claim 16, comprising a step of alternating the pump supplying the hydraulic power required in full each time the turbine engine is started.

18. The control method according to claim 15, wherein the flow rate or the distribution of hydraulic power is established as a function of at least one factor from among an operating point of the turbine engine, the state of health of each regulation loop of the electronic computer, a state of health of each motor pump, a margin on shutdown or pumping, the current acceleration/deceleration, the power supplied by the turbine engine, a flight condition.

19. The control method according to claim 8, comprising a step of monitoring an efficiency of the electric motors and of the pump or the pumps.

20. The system for pumping and metering the fluid according to claim 1, wherein the system is adapted and configured to implement a method according to claim 9.

* * * * *